United States Patent
Choi et al.

(10) Patent No.: US 11,302,902 B2
(45) Date of Patent: Apr. 12, 2022

(54) METHOD FOR MANUFACTURING AN ELECTRODE ASSEMBLY FOR A BATTERY CELL AND BATTERY CELL

(71) Applicants: Robert Bosch GmbH, Stuttgart (DE); GS Yuasa International Ltd., Kyoto (JP)

(72) Inventors: Joo Young Choi, Ludwigsburg (DE); Sarmimala Hore, Fruemsen (CH)

(73) Assignees: ROBERT BOSCH GMBH, Stuttgart (DE); GS YUASA INTERNATIONAL LTD, Kyoto (JP)

( * ) Notice: Subject to any disclaimer, the term of this patent is extended or adjusted under 35 U.S.C. 154(b) by 34 days.

(21) Appl. No.: 16/385,287

(22) Filed: Apr. 16, 2019

(65) Prior Publication Data

US 2019/0334158 A1 Oct. 31, 2019

(30) Foreign Application Priority Data

Apr. 20, 2018 (EP) ..................................... 18168363

(51) Int. Cl.
*H01M 4/04* (2006.01)
*H01M 10/04* (2006.01)
(Continued)

(52) U.S. Cl.
CPC ........... *H01M 4/043* (2013.01); *H01M 4/139* (2013.01); *H01M 10/0431* (2013.01);
(Continued)

(58) Field of Classification Search
CPC ........ H01M 4/043; H01M 4/139; H01M 2/18; H01M 2220/20; H01M 10/0431;
(Continued)

(56) References Cited

U.S. PATENT DOCUMENTS

| 2005/0260490 | A1* | 11/2005 | Persi | ........................ | H01M 2/16 |
| | | | | | 429/144 |
| 2011/0104567 | A1* | 5/2011 | Lee | ...................... | H01M 16/006 |
| | | | | | 429/211 |

(Continued)

FOREIGN PATENT DOCUMENTS

| DE | 10 2016 218 496 A1 | 3/2018 |
| EP | 3 246 979 A1 | 11/2017 |

(Continued)

*Primary Examiner* — Matthew W Van Oudenaren
(74) *Attorney, Agent, or Firm* — Maginot, Moore & Beck, LLP

(57) ABSTRACT

The invention refers to a method for manufacturing an electrode assembly for a battery cell, whereat segments of a first electrode are placed between a continuous first separator sheet and a continuous second separator sheet; segments of a second electrode are placed on an opposite side of the first separator sheet in respect of the segments of the first electrode and on an opposite side of the second separator sheet in respect of the segments of the first electrode such that a tape element is formed; and the tape element is folded such that the segments of the first electrode and the segments of the second electrode are aligned in a stacking direction. The invention also refers to a battery cell, in particular a lithium ion battery cell, comprising an electrode assembly manufactured using the method according to the invention.

7 Claims, 4 Drawing Sheets

(51) Int. Cl.
- *H01M 10/0525* (2010.01)
- *H01M 2/18* (2006.01)
- *H01M 4/139* (2010.01)
- *H01M 50/463* (2021.01)
- *H01M 10/0587* (2010.01)

(52) U.S. Cl.
CPC ..... *H01M 10/0525* (2013.01); *H01M 50/463* (2021.01); *H01M 10/0587* (2013.01)

(58) Field of Classification Search
CPC ........... H01M 10/0525; H01M 10/052; H01M 10/0583; H01M 10/0459; H01M 10/0413; H01M 10/0585; H01M 2220/10; H01M 2220/30; H01M 50/463; H01M 50/461
See application file for complete search history.

(56) References Cited

U.S. PATENT DOCUMENTS

| | | | |
|---|---|---|---|
| 2012/0107676 A1* | 5/2012 | Han | H01M 2/06 429/179 |
| 2014/0272537 A1 | 9/2014 | Kretschmar et al. | |
| 2015/0034249 A1* | 2/2015 | Lee | H01M 4/0404 156/379.7 |
| 2018/0083255 A1* | 3/2018 | Kim | H01M 2/266 |
| 2019/0237797 A1* | 8/2019 | Cho | H01M 10/0404 |

FOREIGN PATENT DOCUMENTS

| | | | |
|---|---|---|---|
| JP | 2012074402 A | | 4/2012 |
| WO | WO2018004185 | * | 1/2018 |

* cited by examiner

METHOD FOR MANUFACTURING AN ELECTRODE ASSEMBLY FOR A BATTERY CELL AND BATTERY CELL

This application claims priority to European Application No. EP 18168363.2, filed on Apr. 20, 2018. The entire contents of the above-mentioned patent applications are incorporated herein by reference as part of the disclosure of this U.S. application.

The invention relates to a method for manufacturing an electrode assembly for a battery cell, whereat the electrode assembly comprises segments of a first electrode and segments of a second electrode that are aligned in a stacking direction. The invention also relates to a battery cell which comprises an electrode assembly which is manufactured using the method according to the invention.

STATE OF THE ART

Electrical energy can be stored by means of batteries. Batteries change chemical energy into electrical energy. Particularly, rechargeable batteries are known that can be charged and discharged several times. Batteries or battery modules comprise several battery cells that are connected electrically in series or in parallel.

Especially, lithium ion battery cells are used in rechargeable batteries or battery systems. Lithium ion battery cells have a relatively high energy density. Lithium ion battery cells are used for instance in motor vehicles, in particular in electric vehicles (EV), in hybrid electric vehicles (HEV) and in plug-in hybrid vehicles (PHEV). Lithium ion battery cells may comprise one or more electrode assemblies.

Electrode assemblies have a positive electrode called cathode and a negative electrode called anode. The anode and the cathode are separated from one another by means of a separator. The electrodes of the battery cell can be formed like tapes and wound with interposition of the separator to form an electrode roll, also referred to as jelly-roll. Alternatively, the electrodes can be formed like sheets and layered with interposition of sheets of the separator to form an electrode stack.

The document US 2013/0143088 A1 discloses an electrode assembly and a process for preparation of the same. Therein, a plurality of first unit electrodes and a second electrode sheet are wound so that the first unit electrodes are opposite to the second electrode sheet via a separator sheet, and a first electrode and a second electrode have opposite polarities.

The document US 2016/0293994 A1 discloses a stack-folding type electrode assembly and a method for manufacturing the same. Thereat, the electrode assembly includes a plurality of stack type unit cells which are stacked on one another with a continuous folding separator sheet interposed between each of the stacked unit cells.

The document EP 2 765 637 B1 discloses a separator having a porous coating layer and an electrochemical device containing the same. Said electrochemical device is for example a lithium secondary battery which comprises a positive electrode, a negative electrode and a separator which is interposed between said electrodes.

The document U.S. Pat. No. 8,574,743 B2 discloses an electrochemical device with an alternative separator system. Thereat, the electrochemical device comprises multi-stacked unit cells of fuel cells or bi-cells and a separation film disposed in between. Thereby, the separation film and separators are alternately stacked between electrode layers with an opposite polarity.

The document JP 5291811 B2, discloses a method and a device for manufacturing a secondary battery. Thereat, several positive electrode plates and several negative electrode plates are placed on a continuous first separator at predetermined intervals. Then, another continuous separator is placed on the electrode plates and on the first separator.

SUMMARY OF THE INVENTION

A method for manufacturing an electrode assembly for a battery cell, in particular for a lithium ion battery cell, is proposed. According to the inventive method, segments of a first electrode are placed between a continuous first separator sheet and a continuous second separator sheet. Thereat, the segments of the first electrode are placed such that gaps remain between two adjacent segments in a longitudinal direction. Thereat, the first electrode may be an anode or a cathode.

The separator sheets are flat tapes that have an extension in the longitudinal direction which is much greater, for example 100 times to 1000 times, than an extension in a lateral direction. The lateral direction is perpendicular to the longitudinal direction. The segments of the first electrode are also flat but have an extension in the longitudinal direction which is similar to an extension in the lateral direction. For example, the extension of the segments of the first electrode in the longitudinal direction is between half the extension in the lateral direction and twice the extension in the lateral direction.

After that, segments of a second electrode are placed on an opposite side of the second separator sheet in respect of the segments of the first electrode; also, segments of the second electrode are placed on an opposite side of the second separator sheet in respect of the segments of the first electrode. If the first electrode is an anode, then the second electrode is a cathode. If the first electrode is a cathode, then the second electrode is an anode.

The segments of the second electrode are also flat but have an extension in the longitudinal direction which is similar to an extension in the lateral direction. For example, the extension of the segments of the second electrode in the longitudinal direction is between half the extension in the lateral direction and twice the extension in the lateral direction. The segments of the second electrode have similar extensions as the segments of the first electrode.

Hence, a tape element is formed. Said tape element comprises the segments of the first electrode, the separator sheets and the segments of the second electrode. Thereat, the segments of the first electrode are arranged centrally. Said segments of the first electrode are surrounded by the first separator sheet and the second separator sheet. The segments of the second electrode are placed outside on the separator sheets.

Then, the tape element is folded such that the segments of the first electrode and the segments of the second electrode are aligned in a stacking direction. Thereat, there is always a separator sheet arranged between the segments of the first electrode and the segments of the second electrode. Said stacking direction is perpendicular to the lateral direction and perpendicular to the longitudinal direction.

Hence, an electrode assembly is formed which comprises in alternating order several segments of the first electrode and several segments of the second electrode, in each case with interposition of a separator sheet. Thereat, the segments of the first electrode form a first electrode of the electrode assembly and the segments of the second electrode form a second electrode of the electrode assembly.

According to an advantageous embodiment of the invention, the segments of the first electrode are laminated between the first separator sheet and the second separator sheet by using a heat pressing role which presses on the first separator sheet or on the second separator sheet. Thus, the first separator sheet and the second separator sheet are bonded inter alia in the gaps between the segments of the first electrode. Thereby, the first separator sheet and the second separator sheet form bags that receive the segments of the first electrode.

According to another advantageous embodiment of the invention, the segments of the first electrode are laminated between the first separator sheet and the second separator sheet by using a first heat pressing role which presses on the first separator sheet and a second heat pressing role which presses on the second separator sheet. Thus, the first separator sheet and the second separator sheet are bonded inter alia in the gaps between the segments of the first electrode. Thereby, the first separator sheet and the second separator sheet form bags that receive the segments of the first electrode.

Preferably, the segments of the second electrode are placed alternately on the first separator sheet and on the second separator sheet. That means, in the longitudinal direction adjacent segments of the second electrode are arranged on opposite sides of the separator sheets.

According to an advantageous embodiment of the invention, the tape element is folded in the same direction constantly such that the segments of the first electrode and the segments of the second electrode are aligned in the stacking direction.

According to another advantageous embodiment of the invention, the tape element is folded ever-changing in opposite directions such that the segments of the first electrode and the segments of the second electrode are aligned in the stacking direction.

According to a further development of the invention, an adhesive layer is applied on the first separator sheet and/or on the second separator sheet such that the segments of the first electrode are placed on said adhesive layer. Thereat, the adhesive layer is applied before the segments of the first electrode are placed between the first separator sheet and the second separator sheet.

According to a another further development of the invention, an adhesive layer is applied on the first separator sheet and/or on the second separator sheet such that the segments of the second electrode are placed on said adhesive layer. Thereat, the adhesive layer is applied before the segments of the second electrode are placed on the first separator sheet and on the second separator sheet.

Furthermore, a battery cell, in particular lithium ion battery cell, is proposed that comprises at least one electrode assembly which is manufactured using the method according to the invention.

A battery cell according to the invention is usable advantageously in particular in an electric vehicle (EV), in a hybrid electric vehicle (HEV), in a plug-in hybrid vehicle (PHEV), in a stationary battery or in a consumer electronic product. Consumer products are inter alia mobile phones, tablets, notebooks or handheld computers. A stationary application is for example a wind power plant. But also other applications are feasible.

Advantages of the Invention

The method according to the invention allows a relative fast and cheap manufacturing of electrode assemblies for battery cells. In particular, advantageous features of the production of electrode rolls and the production of electrode stacks are combined. Thereat, the separator sheets are connected to each other and to the electrode segments by chemical bonding.

Chemical bonding by lamination of the electrode segments between the separator sheets prevents shrinkage of the separator sheets during abuse test. Said tests are for example nail penetration tests, hot box test or external short circuit tests. Even the continuous separator sheets will prevent shrinkage due to the mechanical strength in the folding direction. Hence, safety will be improved by lamination and continuous separator. With an adhesive layer on the separator sheets, chemical bonding between the separator sheets and the electrode segments is formed after lamination.

BRIEF DESCRIPTION OF THE DRAWINGS

For a better understanding of the aforementioned embodiments of the invention as well as additional embodiments thereof, reference should be made to the description of embodiments below, in conjunction with the appended drawings showing.

Hereinafter, preferred embodiments of the present invention will be described with reference to the drawings. The drawings only provide schematic views of the invention. Like reference numerals refer to corresponding parts, elements or components throughout the figures, unless indicated otherwise.

DESCRIPTION OF EMBODIMENTS

Figure 1:
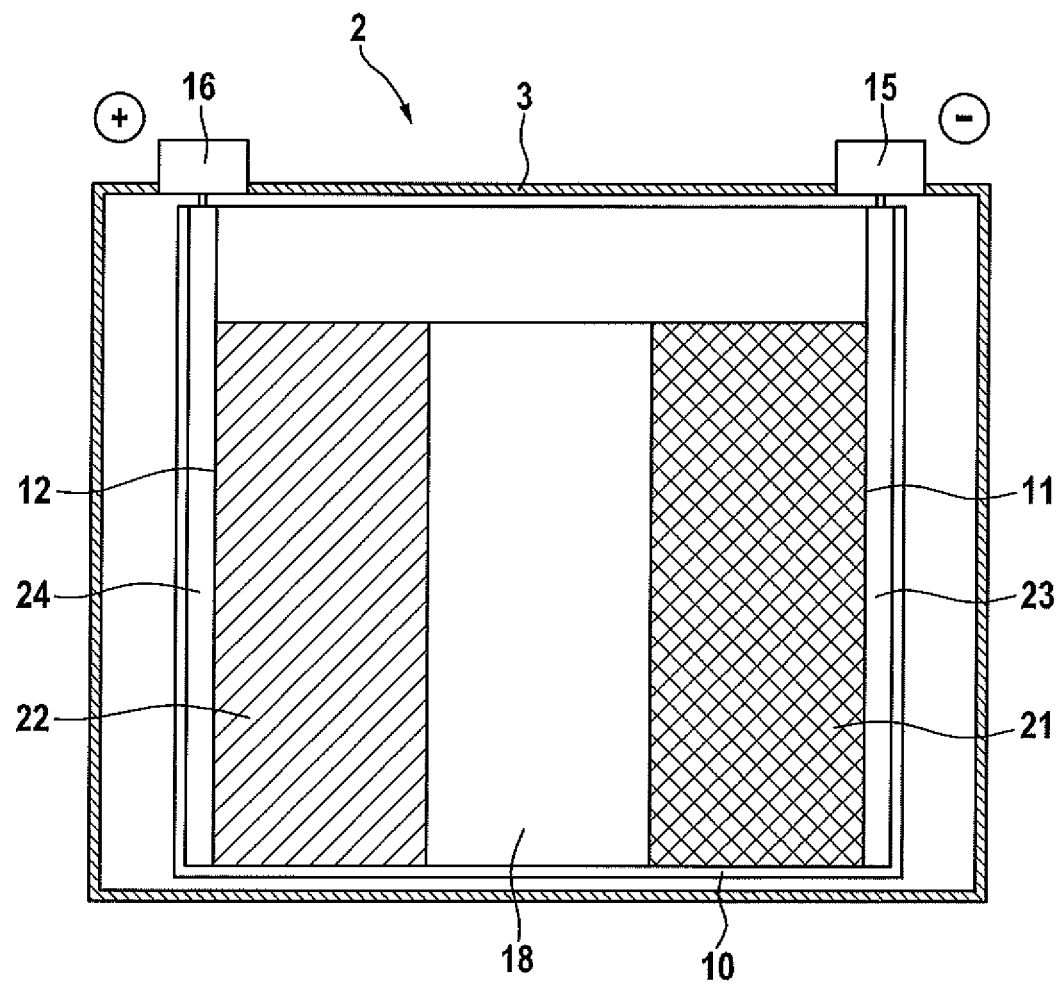
FIG. 1 a schematic view at a battery cell,
FIG. 2 a schematic view at a lamination process,
FIG. 3 a schematic view at a tape element,
FIGS. 4a-4c stages of folding a tape element, and
FIG. 5 a schematic view at an electrode assembly.

FIG. 1 shows a schematic view at a battery cell 2. The battery cell 2 contains a housing 3 which is for example of pouch type and which has a prismatic shape. The battery cell 2 further contains an electrode assembly 10, which is arranged within the housing 3. The housing 3 is a for example a bag or a pouch made of a soft material. The housing 3 also can be made of a stiff material that surrounds the electrode assembly 10.

Furthermore, the battery cell 2 contains a negative terminal 15 and a positive terminal 16. Between the terminals 15, 16, an output voltage of the battery cell 2 is supplied. The terminals 15, 16 serve for charging and discharging the battery cell 2. The terminals 15, 16 protrude from the housing 3. The electrode assembly 10 contains an anode 11, a cathode 12 and a separator 18 that is arranged between the anode 11 and the cathode 12.

The anode 11 contains an anode composite material 21 and an anode current collector 23. The anode composite material 21 and the anode current collector 23 are attached to one another. The anode current collector 23 is electrically conductive and is made of a metal, in particular of copper. The anode current collector 23 is electrically connected to the negative terminal 15 of the battery cell 2. The anode composite material 21 contains active material.

The cathode 12 contains a cathode composite material 22 and a cathode current collector 24. The cathode composite material 22 and the cathode current collector 24 are attached to one another. The cathode current collector 24 is electrically conductive and is made of a metal, in particular of aluminium. The cathode current collector 24 is electrically connected to the positive terminal 16 of the battery cell 2. The cathode composite material 22 also contains active material.

Figure 2:
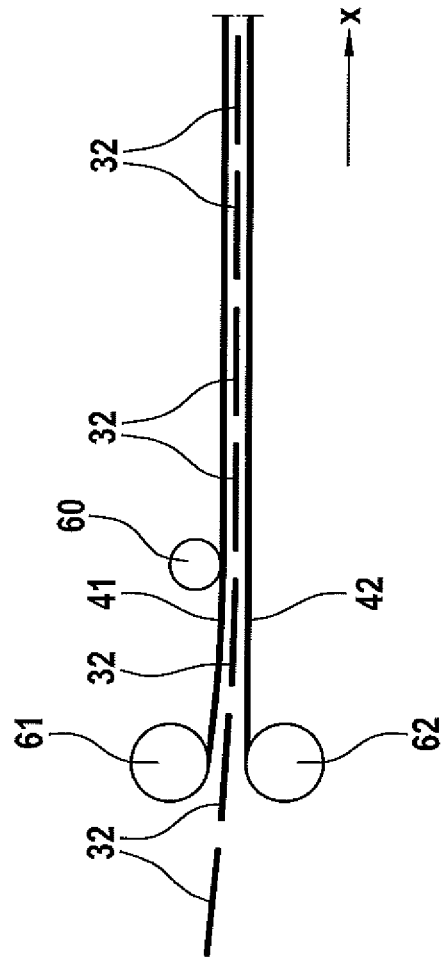

FIG. 2 shows a schematic view at a lamination process. A continuous first separator sheet 41 is provided on a first coil 61. A continuous second separator sheet 42 is provided on a second coil 62. The separator sheets 41, 42 are unwound from the coils 61, 62 into a longitudinal direction x. The separator sheets 41, 42 are flat tapes that have an extension in the longitudinal direction x which is much greater, for example 100 times to 1000 times, than an extension in a lateral direction. The lateral direction is perpendicular to the plane of projection and perpendicular to the longitudinal direction x.

Figure 3:
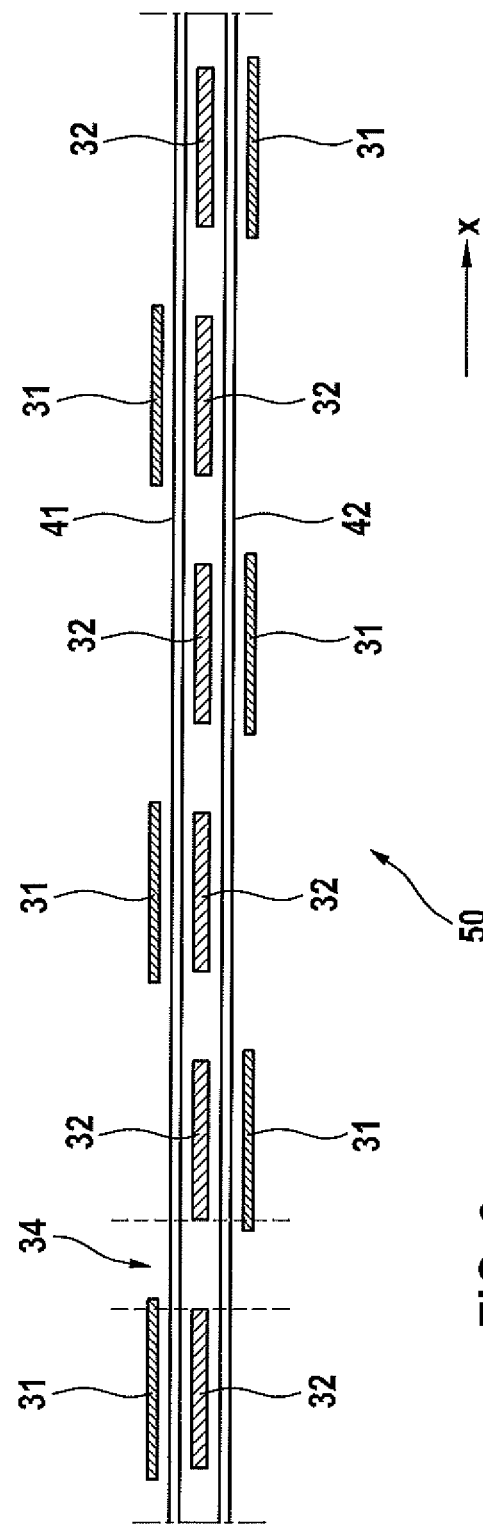

Cathode segments 32 are placed between the first separator sheet 41 and the second separator sheet 42. The cathode segments 32 are also flat but have an extension in the longitudinal direction x which is similar to an extension in the lateral direction. For example, the extension of the cathode segments 32 in the longitudinal direction x is between half the extension in the lateral direction and twice the extension in the lateral direction. The cathode segments 32 are placed such that gaps 34 remain between two adjacent cathode segments 32 in the longitudinal direction x. Said gaps 21 are shown in FIG. 3.

The cathode segments 32 are laminated between the first separator sheet 41 and the second separator sheet 42 by using a heat pressing role 60 which presses on the first separator sheet 41. Thus, the first separator sheet 41 and the second separator sheet 42 are bonded inter alia in the gaps 34 between the cathode segments 32. Thereby, the first separator sheet 41 and the second separator sheet 42 form bags that receive the cathode segments 32.

After that, anode segments 31 are placed on the separator sheets 41, 42 such that a tape element 50 is formed. FIG. 3 shows a schematic view at said tape element 50. The tape element 50 comprises the anode segments 31, the separator sheets 41, 42 and the cathode segments 32. Thereat, the cathode segments 32 are arranged centrally and are surrounded by the first separator sheet 41 and the second separator sheet 42. The anode segments 31 are placed outside on the separator sheets 41, 42.

The anode segments 31 are also flat but have an extension in the longitudinal direction x which is similar to an extension in the lateral direction. For example, the extension of the anode segments 31 in the longitudinal direction x is between half the extension in the lateral direction and twice the extension in the lateral direction. The anode segments 31 have similar extensions as the cathode segments 32.

As mentioned already, the cathode segments 32 are placed such that gaps 34 remain between two adjacent cathode segments 32 in the longitudinal direction x. The anode segments 31 are placed on an opposite side of the first separator sheet 41 in respect of the cathode segments 32 and on an opposite side of the second separator sheet 42 in respect of the cathode segments 32.

The anode segments 31 are placed alternately on the first separator sheet 41 and on the second separator sheet 42. That means, in the longitudinal direction x adjacent anode segments 31 are arranged on opposite sides of the separator sheets 41, 42.

Figure 4A:
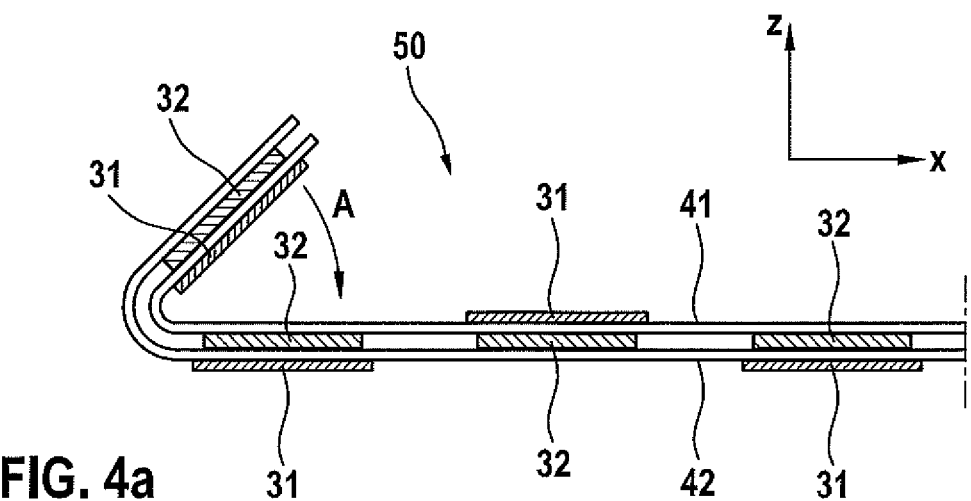
Figure 4B:
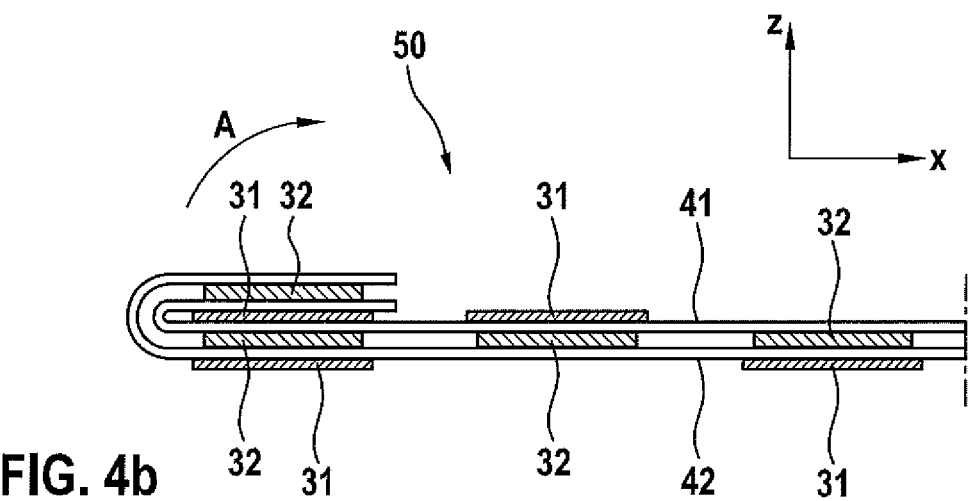
Figure 4C:
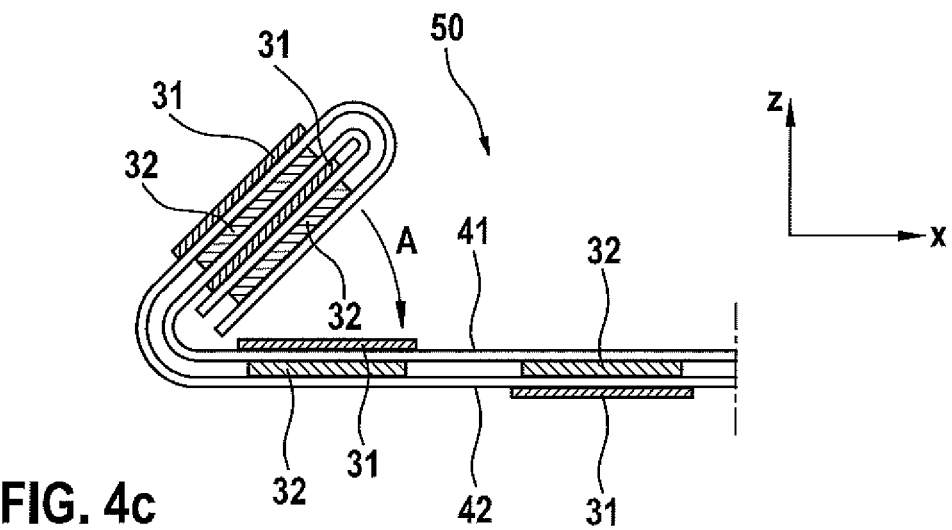

FIG. 4a, FIG. 4b and FIG. 4c show stages of folding the tape element 50 given in FIG. 3. The tape element 50 is folded such that the cathode segments 32 and the anode segments 31 are aligned in a stacking direction z. Said stacking direction z is perpendicular to the lateral direction and perpendicular to the longitudinal direction x.

Beginning from FIG. 4a, a first section of the tape element 50 containing one cathode segment 32 and one anode segment 31 is folded by 180° and is placed on the residual tape element 50. The folding direction is indicated by an arrow A. Thereat, said first section is placed on a second section of the residual tape element 50 such that the cathode segment 32 of said first section, the anode segment 31 of said first section, one cathode segment 32 of said second section and one anode segment 31 of said second section are aligned in the stacking direction z.

After said first folding operation of the tape element 50, the first section is placed on the second section as shown in FIG. 4b. Thereat, there is always a separator sheet 41, 42 arranged between adjacent anode segments 31 and cathode segments 32.

In a second folding operation that is shown in FIG. 4c, said first section and said second section are folded by 180° and are placed on a third section of the tape element 50. The folding direction is again indicated by the arrow A. Said folding operations of the tape element 50 are repeated several times until an electrode assembly 10 is formed.

Presently, the tape element 50 is folded in the same direction constantly as indicated by the arrow A. Alternatively, the tape element 50 can be folded ever-changing in opposite directions.

Figure 5:
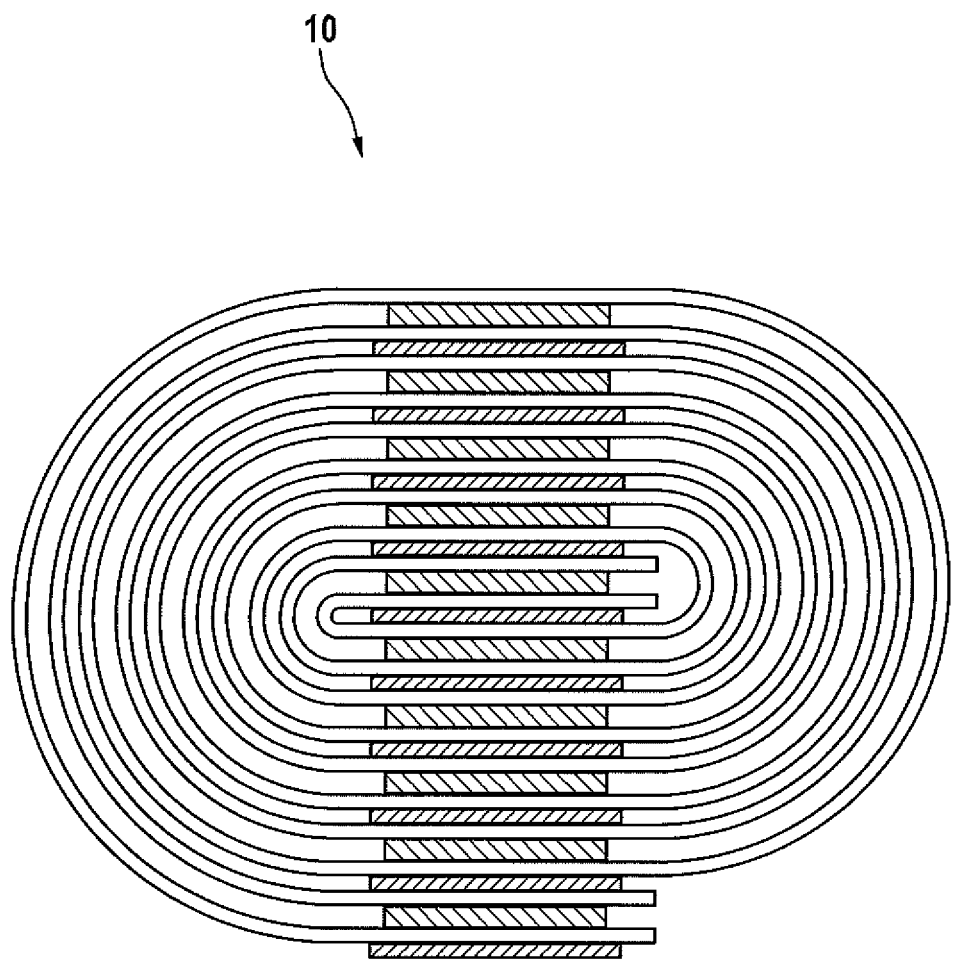

FIG. 5 shows a schematic view at such an electrode assembly 10 for the battery cell 2 shown in FIG. 1. The electrode assembly 10 comprises in alternating order several anode segments 31 and several cathode segments 32 that are aligned in the stacking direction z and that are in each case separated from one another by the separator sheets 41, 42.

Thereat, the anode segments 31 form the anode 11 of the electrode assembly 10, and the cathode segments 32 form the cathode 12 of the electrode assembly 10. The first separator sheet 41 and the second separator sheet 42 form the separator 18.

The anode segments 31 comprise anode tabs which are not shown here and that protrude in the lateral direction. Said anode tabs are part of the anode current collector 23. The anode tabs are electrically and mechanically connected to each other. Hence, the anode segments 31 are electrically connected in parallel when forming the anode 11.

The cathode segments 32 comprise cathode tabs which are not shown here and that protrude in the lateral direction. Said cathode tabs are part of the cathode current collector 24. The cathode tabs are electrically and mechanically connected to each other. Hence, the cathode segments 32 are electrically connected in parallel when forming the cathode 12.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings and those encompassed by the attached claims. The embodiments were chosen and described in order to explain the principles of the invention and its practical applications, to thereby enable others skilled in the art to utilize the invention and various embodiments with various modifications as are suited to the particular use contemplated.

The invention claimed is:

1. A method for manufacturing an electrode assembly for a battery cell, comprising:
    providing a continuous first separator sheet and a continuous second separator sheet, each having a first side and an opposite second side;

applying an adhesive layer on the first side of both the continuous first separator sheet and the continuous second separator sheet such that segments of a second electrode can be placed on said adhesive layer;

placing segments of a first electrode between the second side of the continuous first separator sheet and the second side of the continuous second separator sheet;

placing segments of the second electrode on the adhesive layer of the first separator sheet on an opposite side of the first separator sheet in respect of the segments of the first electrode and on the adhesive layer of the second separator sheet on an opposite side of the second separator sheet in respect of the segments of the first electrode, alternately on the first separator sheet and on the second separator sheet in relation to successive segments of the first electrode, such that a tape element is formed; and then folding the tape element in the same direction constantly such that the segments of the first electrode and the segments of the second electrode are aligned in a stacking direction and the segments of the second electrode contact said adhesive layer.

2. The method according to claim 1, further comprising laminating the segments of the first electrode between the first separator sheet and the second separator sheet by using a heat pressing roll which presses on the first separator sheet or on the second separator sheet.

3. The method according to claim 1, further comprising laminating the segments of the first electrode between the first separator sheet and the second separator sheet by using a first heat pressing roll which presses on the first separator sheet and a second heat pressing roll which presses on the second separator sheet.

4. The method according to claim 1, further comprising placing the segments of the second electrode alternately on the first separator sheet and on the second separator sheet.

5. The method according to claim 1, wherein an additional adhesive layer is applied on the second side of one or both of the first separator sheet and the second separator sheet such that the segments of the first electrode are placed on said additional adhesive layer.

6. A battery cell comprising an electrode assembly manufactured using the method according to claim 1.

7. The method of claim 1 further comprising:
incorporating the electrode assembly into a battery cell; and
incorporating the battery cell into an electric vehicle (EV), a hybrid electric vehicle (HEV), a plug-in hybrid vehicle (PHEV), a consumer electronic product or a stationary application.

* * * * *